United States Patent [19]

Ortloff et al.

[11] 4,311,327
[45] Jan. 19, 1982

[54] UNIVERSAL JOINT FOR MULTIPLE FLOWLINE SYSTEM

[75] Inventors: John E. Ortloff; Clarence F. Stelzer, Jr.; Donald R. Hayes, all of Houston, Tex.

[73] Assignee: Exxon Production Research Company, Houston, Tex.

[21] Appl. No.: 105,679

[22] Filed: Dec. 20, 1979

[51] Int. Cl.³ .......................................... F16L 39/00
[52] U.S. Cl. ................................ 285/136; 285/94; 285/137 R; 285/152; 285/165; 285/274; 285/281; 285/299; 285/168; 285/DIG. 1; 137/799
[58] Field of Search ................ 285/151, 152, 168, 265, 285/98, 131, 94, 136, 223, 264, 272, 273, 274, 137 R, 165, 281, 299, DIG. 1, 134; 64/17 A; 137/799; 166/355, 341

[56] References Cited

U.S. PATENT DOCUMENTS

| | | | |
|---|---|---|---|
| 217,006 | 7/1879 | Holland | 285/152 |
| 508,705 | 11/1893 | Hampson | 285/168 X |
| 584,449 | 9/1897 | Thompson | 285/273 X |
| 710,514 | 10/1902 | Riexinger | 285/152 |
| 751,272 | 2/1904 | Ewald | 2/237 |
| 751,273 | 2/1904 | Fahrney | 285/152 |
| 1,003,042 | 9/1911 | Forth | 285/151 |
| 1,005,407 | 10/1911 | Brousseau | 285/152 |
| 1,007,655 | 10/1911 | Forth | 285/151 |
| 2,397,585 | 4/1946 | Anderson | 64/17 A |
| 2,512,690 | 6/1950 | Smith et al. | 64/17 A |
| 2,773,368 | 12/1956 | Slaught | 64/17 A |
| 3,176,805 | 4/1965 | Gandy | 64/7 |
| 3,313,345 | 4/1967 | Fischer | 166/355 |
| 3,465,817 | 9/1969 | Vincent | 166/355 |
| 3,465,818 | 9/1969 | Dixon | 166/303 |
| 3,663,044 | 5/1972 | Contreras et al. | 285/226 |
| 3,977,707 | 8/1976 | Oliver | 285/265 |
| 4,031,919 | 6/1977 | Ortloff | 137/799 |
| 4,036,295 | 7/1977 | Kirkland | 166/344 |
| 4,066,098 | 1/1978 | Gallo | 137/799 |
| 4,165,108 | 8/1979 | Palais | 137/799 |

OTHER PUBLICATIONS

An Articulated Multiline Production Riser for Deepwater Application, Journal of Pressure Vessel Technology, Feb. 1977, J. E. Ortloff et al.
Production Riser Technology Moves Into Deeper Water, Oil and Gas Journal, Mar. 19, 1979, R. H. Gunderson.
The Development of a Multiline Universal Joint for Subsea Applications, O.T.C., 1975, Ortloff et al.
Deepwater Production Riser, ASME, 1978, Gunderson et al.

Primary Examiner—Dave W. Arola
Attorney, Agent, or Firm—Gary D. Lawson

[57] ABSTRACT

There is disclosed a universal joint for multiple flowline system wherein all of the conduits pass through the interior of the joint. The conduits whichpass through the universal joint on axes offset from the pivot axes of the joint are provided with flexing means which enable the offset conduit to rotate around a pivot axis of the universal joint when the joint is flexed.

12 Claims, 9 Drawing Figures

UNIVERSAL JOINT FOR MULTIPLE FLOWLINE SYSTEM

BACKGROUND OF THE INVENTION

1. Field of the Invention

This invention relates to new and improved articulated joint for flowlines and more particularly relates to a universal joint assembly for a multiple flowline system of the type used in underwater oil or gas production.

2. Description of the Prior Art

Production of crude oil from deep water areas remote from land poses significant problems. For example, in very deep water it is not economically feasible to install rigid ocean floor supported platforms of the type used to support production operations in shallow water. Also, the laying of large diameter pipelines in deep water is often impractical and unattractive economically. One promising approach for overcoming these difficulties involves the use of a production system comprising a production manifold positioned on or near the ocean floor and a riser assembly extending from the production manifold to an overlying moored floating vessel. The floating vessel is provided with conventional processing equipment and a storage area for crude oil. The riser assembly includes multiple flexible flowlines interconnecting the vessel with the subsea wellheads and manifold systems.

Development of a riser assembly that will withstand the forces encountered in typical floating production operations poses severe design problems. The riser system must have sufficient flexibility and structural strength to accommodate motions and withstand forces resulting from vessel excursions and from wave and current action. The riser must also have sufficient flow lines to conduct fluids from the sea bottom to the vessel, to conduct separated water or gas back to the sea bottom and to conduct flowline tools between the vessel and the wellheads.

A number of riser systems have been suggested for subsea petroleum production. One such riser system, commonly designated a "rigid self-standing riser," has a rigid connection at the wellhead or manifold and a flowline housing tensioned by a suitable buoyancy chamber at a distance of about 200 feet (61 meters) below the water surface. The steel flowlines in the flowline housing are then connected from the top of the buoyancy chamber to a moored floating vessel through a bundle of flexible floating hoses. This arrangement requires no special multiline flexible joint to provide flexibility riser but has the disadvantage that it requires heavy ballast and pile anchors to overcome the high tension and bending loads from riser buoyancy and current drag. Another disadvantage is that the flexible hoses are exposed to severe environmental conditions and are vulnerable to damage by surface vessels.

Another more suitable type of production riser, commonly designated a "tension leg riser," uses a single buoy, one multiline universal joint directly below the buoy, a riser stem housing, a second multiline universal joint directly above the base at the ocean floor and a multiple number of flow lines extending from the buoy to the ocean floor. The riser moors the production and storage vessel through a multiline swivel and articulated arm arrangement that permits the vessel to rotate or "weathervane" around the buoy in response to wave, wind and current action. This type of riser can be constructed using rigid flow lines to avoid the problems associated with the use of flexible flowlines. The multiline universal joints from a vital part of the production riser in that they provide the riser system with the requisite flexibility and structural strength to enable it to withstand the severe environmental conditions encountered in deep water operations.

In designing articulated joints, such as universal joints for riser systems having a rigid flowlines, a number of factors must be taken into consideration, including for example, environmental conditions, water depth and the number and sizes of the flow lines. A significant economic and operational consideration is the size of the universal joint. In prior multiline universal joints, only two of the rigid flow lines could pass through the universal joint on the axes of pivot. The remaining rigid flow lines were positioned along the side of the universal joint. Each of the flow lines positioned along the side of the universal joint was provided with fluid swivels at the pivot axes of the universal joint. Because the fluid swivels were required to be located in end to end relation along the axes of pivot, the universal joints for a riser having a large number of flowlines had, by necessity, the fluid swivels extending a substantial distance outside the universal joint. Each additional flow line required an additional fluid swivel on each axis of pivot thereby increasing the overall size of the universal joint. Unfortunately, the larger sized universal joints are more expensive, heavier, more difficult to install, and more susceptible to greater environmental loading. Further, it is difficult to maintain all of the fluid swivels in alignment with the pivot axes of the universal joint. Misalignment causes high stresses in the swivel bearings and results in early fatigue failure of the swivel. Further, in order to replace a fluid swivel immediately adjacent to the universal joint, it was necessary to first remove each of the outer fluid swivels on the axes of pivot. Since the number and sizes of the flow lines are controlled by operating conditions, it is apparent that a need exists for a multiline universal joint that will minimize the stresses imposed on the fluid swivels and provide a relatively compact flexible connection between multiple rigid flow lines to minimize environmental loading and reduce the cost.

SUMMARY OF THE INVENTION

The present invention relates to an articulated joint with multiple flowlines for use with a riser system for production of oil and gas from subsea wells. The riser system includes a riser pipe extending between the botom of the sea and a floating vessel and a plurality of rigid fluid conduits supported by the riser pipe to transport fluids between the floating vessel and the bottom of the sea. The riser system includes at least one multiline articulated joint to provide flexibility for the riser pipe. The articulated joint may be positioned at the ocean floor or at various points along the length of the riser. The articulated joint connects a pair of riser members that support the conduits and provides pivotal movement of the riser members about two axes that are perpendicular to each other. The articulated joint of the present invention such as the universal joint described below enables all the fluid conduits to pass through the interior of the joint thereby solving many of the problems encountered with prior universal joint assemblies with multiple flowlines. Each of the plurality of conduits extending along the riser has a first portion extending generally along the longitudinal axis of one riser member and a second portion extending generally along the longitudinal axis of the other riser member. The first and second portions of two of the conduits extending along the riser are connected to each other by elbow conduits that pass through the universal joint on the pivot axes of the joint. The first and second portions of the remaining conduits are connected to each other by elbow conduits that pass through the universal joint on axes offset from and substantially parallel to the pivot axes of the joint. As the universal joint is flexed, the ends of the offset elbow conduits are rotated around the pivot axes of the universal joint. Each of the first and second conduit portions which are connected to offset elbow conduits are provided with flexing means which function to provide fluid communication between the offset elbow conduits and the first and second conduit portions and permit the ends of the offset elbow conduits to rotate around the pivot axes of the universal joint when the joint is flexed. One suitable type of flexing means is a reinforced rubber hose. A more preferred type of flexing means comprises the combination of a pivot means and a compensating means. Each of the offset elbow conduits is provided with a pivot means at each end. The pivot means enable pivotal movement between the offset elbow conduits and the corresponding first and second conduit portions. Preferably the pivot means comprises a fluid swivel. Each of the first and second conduit portions, which are connected to the offset elbow conduits, is also provided with a compensating means. The compensating means enables rotational movement of the pivot means around the pivot axes of the universal joint when the universal joint is flexed. In a preferred embodiment of the compensating means comprises a means, such as a slip joint, for enabling longitudinal extensible movement of the first and second conduit portions. The compensating means permits longitudinal extensible movement of the first and second portions of the conduits during rotational movement of the pivot means around the pivot axes of the universal joint.

Another type of flexing means comprises the combination of two pivot means. This type of flexing means is the subject of a separate patent application, Ser. No. 105,678 filed even date herewith in the name of R. H. Gunderson. In another embodiment of the present invention one or more (up to four) of the offset conduits may have a first portion which is offset and substantially parallel to the pivot axis of one joint and a second portion which is on the pivot axis of the other joint. In this embodiment only the first portion of the offset conduit is provided with flexing means.

The advantage of the universal joint assembly of this invention over universal joint assemblies used in the past include: a reduction in the stresses imposed on the fluid swivels when the joint is flexed; a reduction in the size and weight of the universal joint; and an improved ability to replace various components of the conduits in the event of equipment failure.

BRIEF DESCRIPTION OF THE DRAWINGS

A more thorough disclosure of the advantages of the present invention is presented in a detailed description which follows and from the accompanying drawings in which.

DESCRIPTION OF PREFERRED EMBODIMENTS

Figure 1:
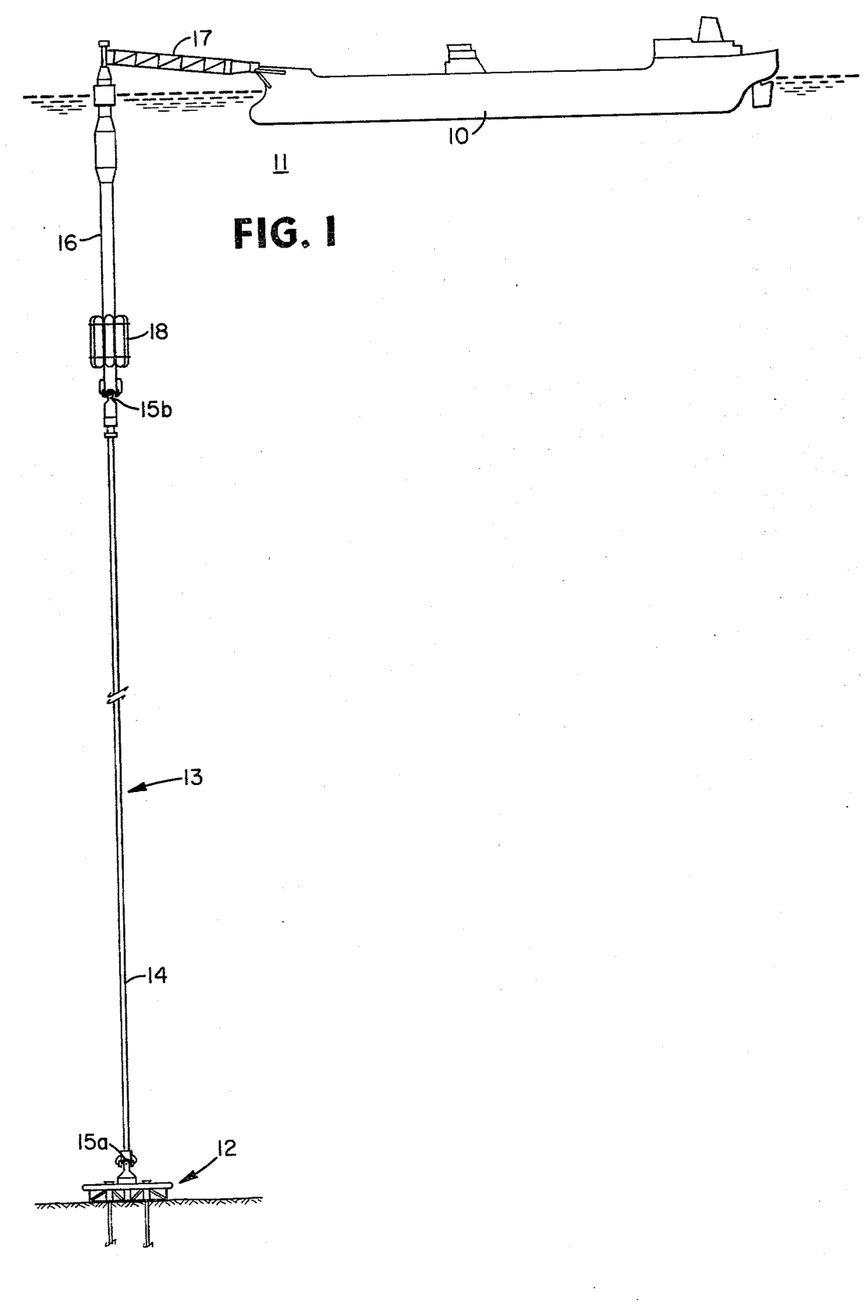
FIG. 1 is an elevation view illustrating a floating vessel positioned over a location wherein a manifold assembly is positioned on the ocean floor and a production riser extends between the manifold assembly and the surface vessel and is provided with universal joints of this invention.

Referring to FIG. 1, a vessel 10 is illustrated as floating on the surface of a body of water 11 while being positioned in a substantially fixed position over a preselected site. This site can be a wellhead, a production manifold, or a gathering point for lines from many wells. The vessel may be used for storage or production and may be any suitable floating or floatable vessel. At the wellhead site, generally designated 12, a riser system 13 comprises a housing 14 for supporting a plurality of rigid lines or conduits which are connected to a production manifold by means of a universal joint 15a which provides a flexible universal connection. Riser 13 is connected at its upper end through another universal joint 15b to buoyant conductor or conduit 16 which is in turn connected to rigid mooring arm 17 on the ship or vessel 10. The riser system may be maintained under tension by the buoyant conduit 16 and reserve buoyancy chamber 18. The riser system as shown is flexible at the upper and lower universal joints 15b and 15a and thereby permits flexing of the riser as a result of currents, environmental forces, drift of the vessel, etc. The universal joints 15a and 15b of this invention may be used in any flexible or articulated riser system requiring a universal joint.

Figure 2:
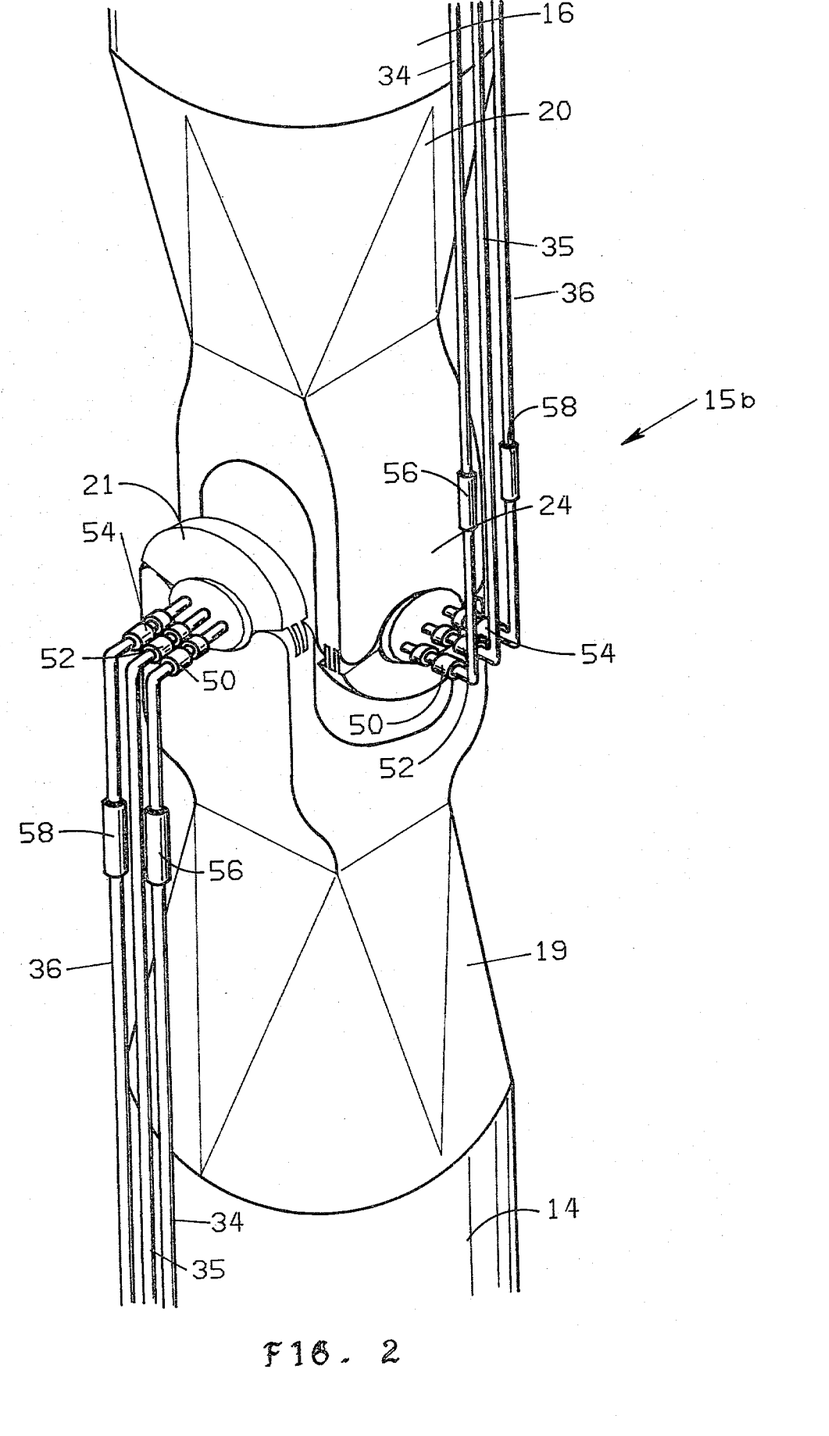
FIG. 2 is a perspective view of one of the universal joints of this invention.

FIGS. 2, 3, 4 and 5 illustrate one preferred embodiment of a universal joint according to this invention. FIG. 2 shows a perspective view of the universal joint 15b as shown in FIG. 1. The universal joint 15b comprises a first longitudinal housing member 19 and a second longitudinal housing member 20 which are connected to riser housing 14 and bouyant conduit 16, respectively. Housing member 19 has a bifurcated end portion or yoke comprising a pair of arms 21 and 22 (see FIG. 5) which have smooth apertures therein which function as bearings. Housing member 20 has a bifurcated end portion or yoke comprising a pair of arms 24 and 25 having smooth apertures therein which function as bearings. A cross member 29 (see FIG. 5) is provided as a connector between the yokes of housing members 19 and 20 to provide universal movement of the joint. Cross member 29 has a plurality of trunnions 30, 31, 32 and 33. Each trunnion has a bore or passage extending completely therethrough so that the cross member is completely hollow. Cross member 29 is positioned with trunnion 30 in the bearing aperture of yoke arm 21 on housing member 19. The oppositely extending trunnion 32 is positioned in bearing aperture on yoke arm 22. The trunnions 31 and 33 of cross member 29 are positioned in apertures of yoke arms 25 and 24, respectively, on housing member 20.

The universal joint 15b is designed to carry a plurality of conduits or pipelines (this particular joint carries six rigid lines or conduits, three lines, 34, 35 and 36 are shown in FIG. 2 and the other three are hiden from view. It should be noted that the arrangement of conduits and connections on housing member 19 and the connections into cross member 29 is identical to that of the conduits and connections from housing member 20 except that they are rotated 90° to fit the trunnions of the cross on which the housing member 19 is pivoted. Conduits 34 and 36 may be larger conduits or pipelines for carrying crude oil, gas, or water and conduit 35 may be a smaller conduit for handling pumpdown tools.

Figure 5:
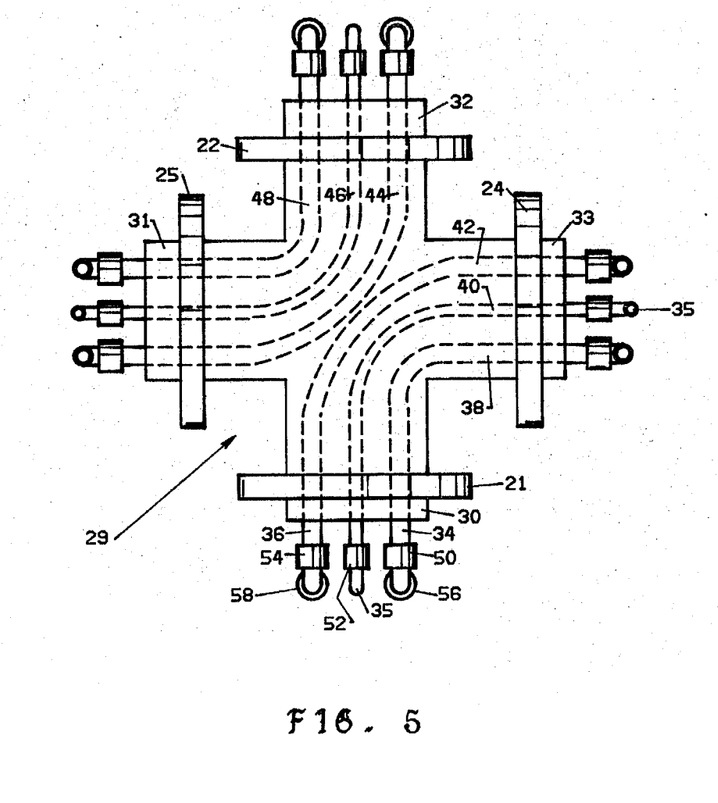
FIG. 5 is a section view taken on line 5—5 of FIG. 3.

Referring to FIG. 5, the cross member 29 is provided with a plurality of elbow conduits 38, 40, 42, 44, 46 and 48, which extend therethrough. The elbow conduits connect the flowlines extending along housing member 19 to the corresponding flowlines extending along housing member 20. For example, elbow conduits 38, 40, and 42 enter the crossmember through trunnion 30 and exit the cross member through trunnion 33. The ends of these elbow conduits, which enter through trunnion 30, are connected to pivot means 50, 52 and 54 respectively. Pivot means 50, 52 and 54 are in turn connected to flow lines 34, 35 and 36 respectively. Elbow conduits 40 and 46 extend through the cross member 29 on the pivot axes of the universal joint. The remaining elbow conduits 38, 42, 44, and 48 are offset conduits and extend through the cross member on axes offset from and substantially parallel to the pivot axes of the universal joint. Flow lines 34 and 36 which are connected to the offset elbow conduit 38 and 42 respectively are further provided with compensating means 56 and 58. The compensating means 56 and 58 are preferably slip joints for enabling longitudinal extensible movement of flowlines 34 and 36. When the universal joint is flexed, the slip joints 56 and 58 enable rotational movement of pivot means 50 and 54 around the pivot axis of the universal joint. Pivot means 50, 52 and 54 preferably comprise fluid swivels.

Figure 3:
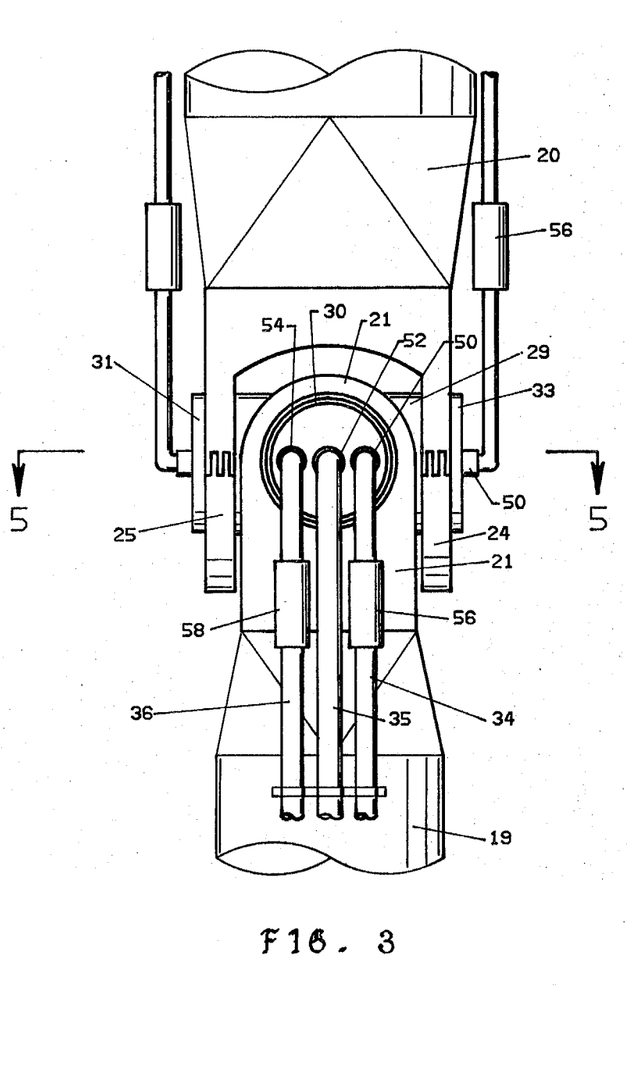
FIG. 3 is a schematic view of the universal joint of FIG. 2.
Figure 4:
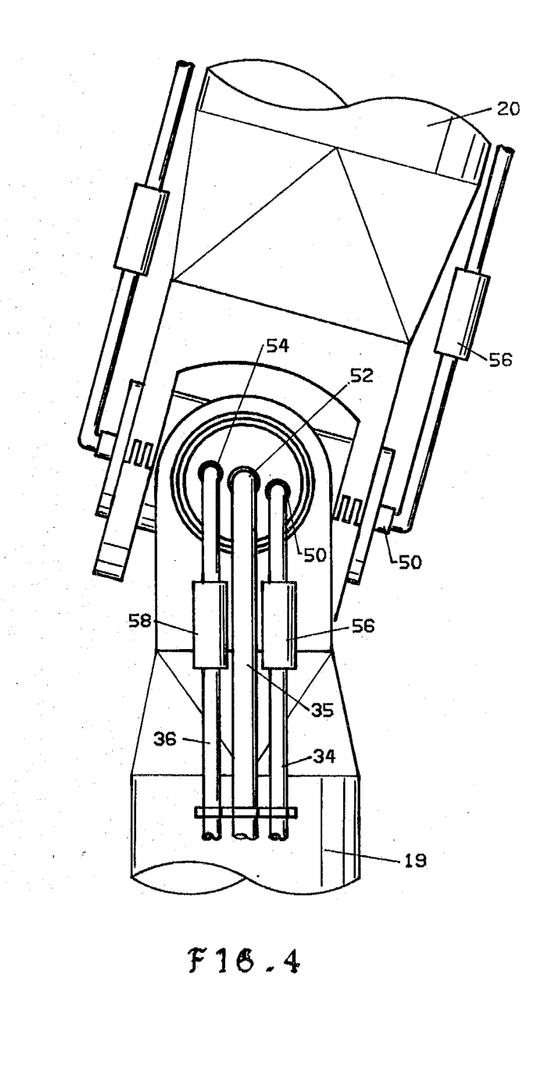
FIG. 4 is a schematic view of the universal joint of FIG. 3 in a flexed position.

Referring to FIGS. 3 and 4, the pivoting of the housing member 20 with respect to the housing member 19 results in a corresponding rotation of cross member 29 about the axis extending through trunnions 30 and 32. Pivot means 50, 52, and 54 enable pivotal movement between flow lines 34, 35 and 36 and elbow conduits 38, 40 and 42 respectively which remain fixed within cross 29 (See FIG. 5). Slip joints 56 and 58 disposed in flow lines 34 and 36 which are connected to offset elbow conduits 38 and 42 respectively, enable pivot means 50 and 54 to rotate around one pivot axis of the universal joint in a plane parallel to the plane of yoke arm 21. Flow line 35 is not provided with a slip joint because it is positioned on the axis of rotation of housing member 20 which is also a pivot axis of the universal joint, and therefore pivot means 52 does not revolve around a pivot axis when the universal joint is flexed.

The system of conduits and pivot means connected through the universal joint 15b has been described for three (3) fluid conduits. For a system of six (6) conduits, the other three (3) conduits have this same connecting arrangement but pass through the other two trunnions. In operation, this multiline, multiconduit universal joint is capable of a substantial degree of flexure along both pivotal axes and accommodates a substantial number of flow lines or conduits in a compact manner. As shown above, when the universal joint is flexed, the system of pivot means accommodates this pivotal movement.

In the embodiment of the universal joint shown in FIGS. 2, 3, 4 and 5, the pivot means disposed between the flow lines and the elbow conduits are aligned in a plane normal to the axes of housing members 19 and 20 when the universal joint is in the unflexed position.

Figure 6:
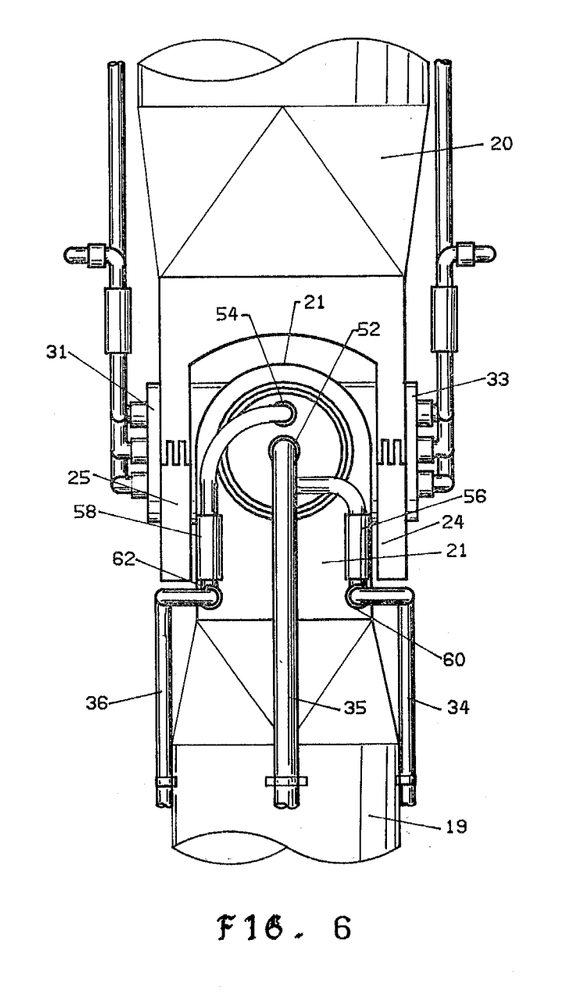
FIG. 6 is a view of an alternative embodiment of the universal joint of the present invention.
Figure 7:
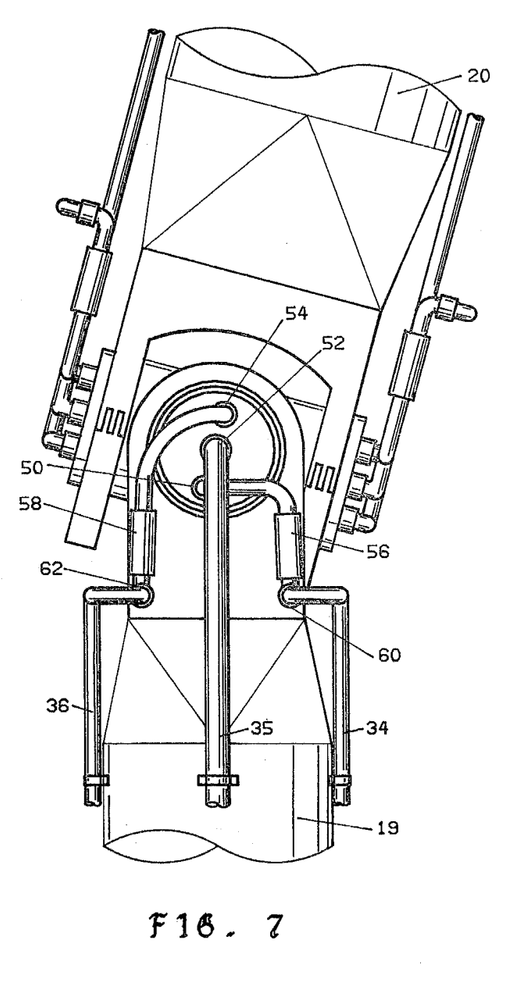
FIG. 7 is a view of the universal joint of FIG. 6 in a flexed position.

Referring to FIGS. 6 and 7, there is shown an alternative embodiment wherein like numbers refers to like parts. In FIGS. 6 and 7, the pivot means of the elbow conduits are aligned in planes normal to the plane of the axes of the cross member 29. The connecting arrangement is the same as that shown in FIGS. 2, 3, 4, and 5. When housing member 20 is pivoted with respect to housing member 19, slip joints 56 and 58 enable pivot means 50 and 54 to rotate around one pivot axis of the universal joint in a plane parallel to the plane of yoke arm 21. In the embodiment shown in FIGS. 6 and 7, it is desirable to provide each of conduits 34 and 36 which are connected to the offset elbow conduits, with a second pivot means, 60 and 62 respectively, to reduce any stress in the flow lines occurring upon the flexing of the universal joint.

Figure 8:
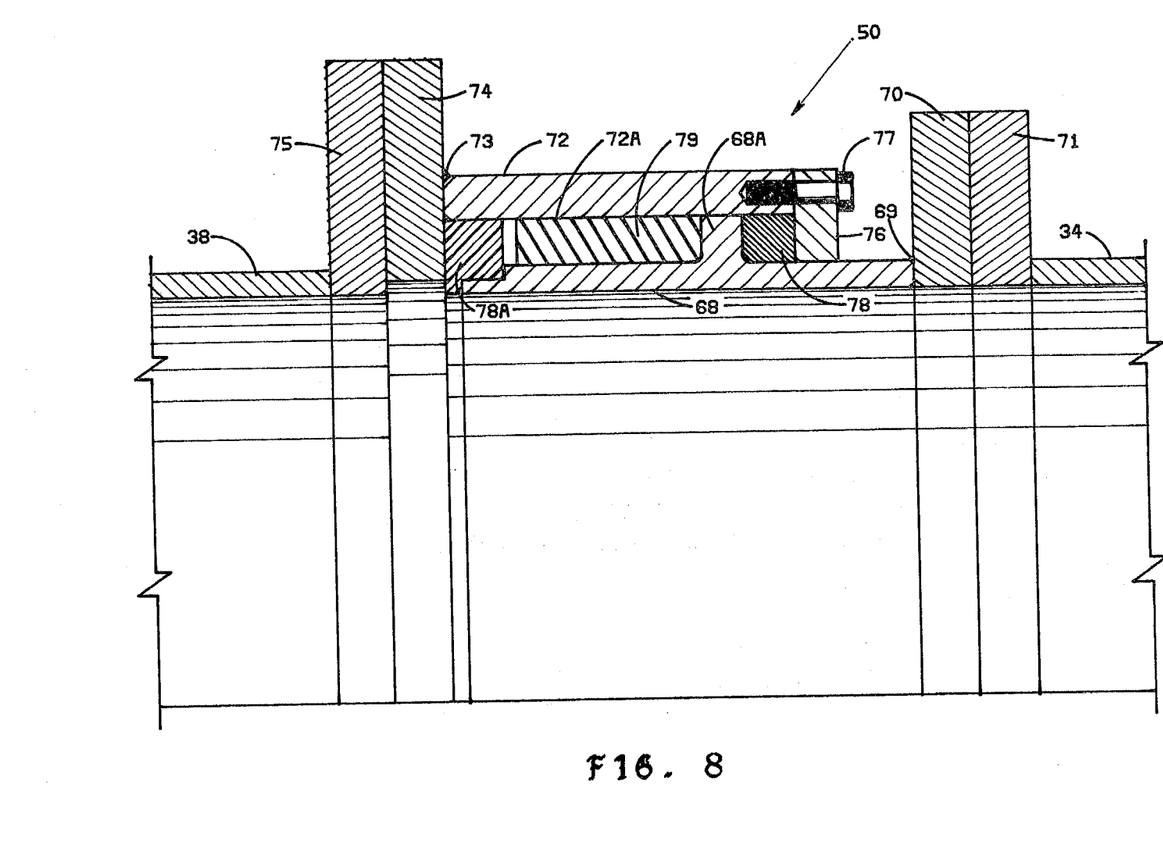
FIG. 8 is a detail view, in longitudinal section and slightly enlarged, of a suitable swivel member for use in the universal joint shown in FIG. 2.

At this point, attention is directed to FIG. 8 for a more complete understanding of one type of suitable pivot means that can be used in the apparatus of this invention. FIG. 8 shows an enlarged longitudinal cross section of fluid swivel member 50 which connects conduit 34 to elbow conduit 38. Swivel member 50 is shown in a sectional view from its center line to the outer edge. Swivel member 50 has an inner cylindrical member 68 having a flange 68A that provides resistance to thrust loads caused by internal pressure. Member 68 is welded as at 69 to flange 70 which is connected to the end flange 71 on conduit 34. Outer cylindrical member 72 of swivel member 50 is welded as at 73 to end flange 74 which is connected to flange 75 on conduit 38. An annular end plate 76 is secured on cylindrical portion or sleeve 72 by a plurality of bolts 77. In the annular space between sleeves 68 and 72 there are positioned bearing members 78 and 78A of a very hard highly polymerized polyethylene or other suitable bearing material. These bearings resist both thrust and radial loads imposed on the swivel by internal and external pressure and by loads applied normal to the axis. There is also positioned a sleeve 79 of an oil resistant synthetic rubber such as acrylonitrile rubber. The rubber sleeve 79 is bonded to the outer surface of swivel sleeve 68 and is movable therewith. The outer surface of rubber sleeve 79 is slidable relative to the inner surface of swivel sleeve 72. The inner surface of sleeve 72 is preferably coated with a thin layer 72A of polymer such as polytetrafluoroethylene (Teflon). This swivel is capable of rotary motion and is fully sealed to prevent leakage of the fluid passing through the conduit. For small degrees of swivel rotation or oscillation, the relative motion between sleeves 68 and 72 is accommodated by deflection of rubber sleeve 79. At higher degrees of rotation, i.e. above about 5°, the sleeve 79 slips on the thin layer of Teflon 72A on the inner surface of swivel sleeve 72. This swivel construction is fully sealed and can handle fully rotary movement. The swivel just described is merely illustrative of the type of swivel that can be used in this invention. Another type of swivel suitable for use in the present invention is the swivel manufactured and sold by FMC Corporation under the trade name Chiksan swivel. Other types of antifriction bearing swivels may also be used in the apparatus of the present invention such as the roller bearing swivels available from Sealol Inc., Continental-Emsco Inc. and National Supply Company. It should be understood that any type of conduit swivel that will permit rotary motion of a fluid-carrying conduit may be used.

Figure 9:
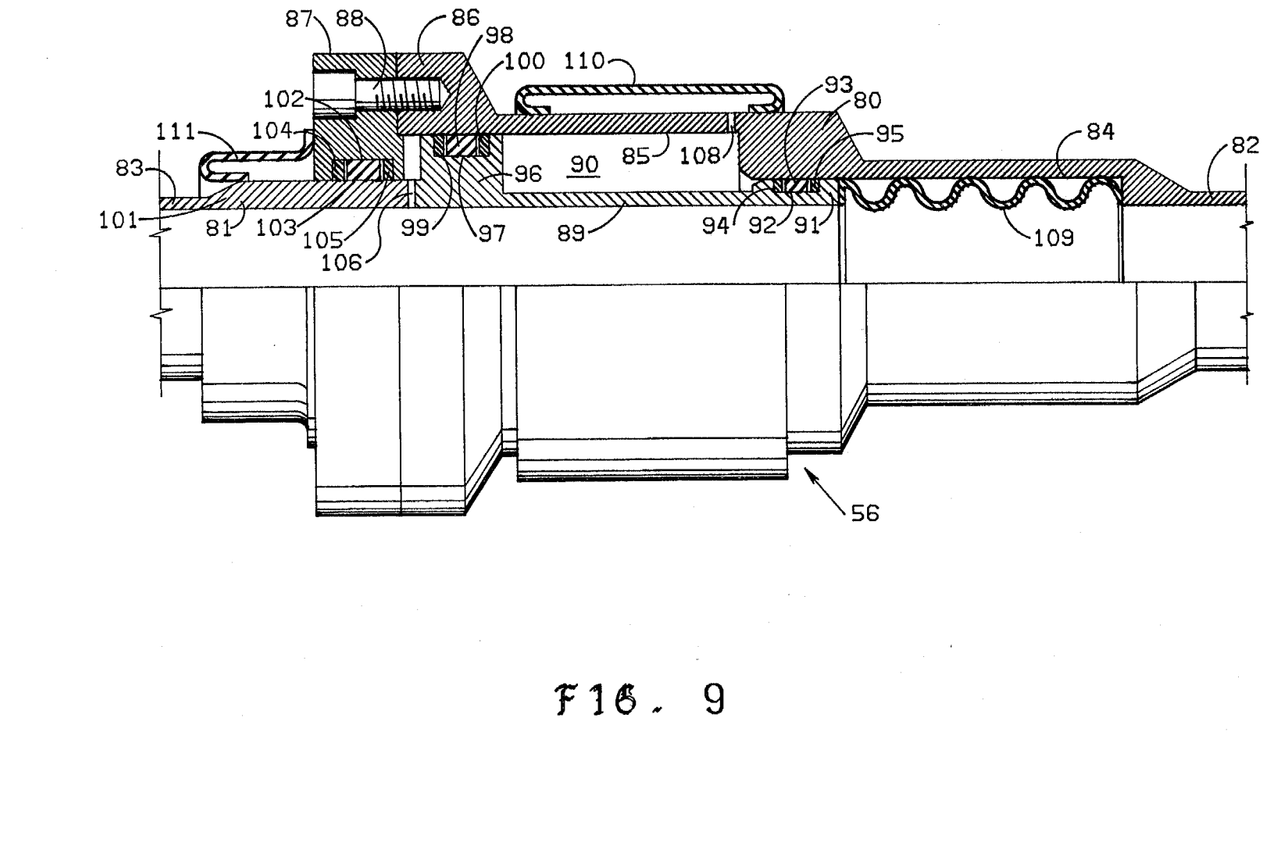
FIG. 9 is a detail view, in longitudinal section and slightly enlarged, of a slip joint used in the universal joints shown in FIG. 2.

FIG. 9 illustrates slip joint 56 in partial longitudinal cross section. Again, it should be understood that this slip joint is only illustrative of one fluid conduit slip joint which may be used in this invention. Slip joint 56 is pressure balanced and consists of outer sleeve 80 and inner sleeve 81. The slip joint is disposed in conduit 34 and both the outer and inner sleeve are connected to conduit 34 to permit longitudinally extensible movement therebetween. Sleeve 80 has a smaller bore 84 which is lined with a thin layer of Teflon to reduce the friction loads. Sleeve 80 has a larger bore 85 also lined with a thin layer of Teflon to reduce the friction loads and a flange 86 on which is secured an annular end plate 87 by a plurality of bolts 88. Inner sleeve 81 has a portion 89 of smaller diameter which defines the chamber 90 in which clean oil is positioned. The end of sleeve portion 89 has a portion 91 of slightly increased diameter which slides in the bore 84 of sleeve 80. End portion 91 has a peripheral recess 92 in which is positioned an elastomeric seal 93 located between a pair of hard plastic (polyethylene) backup rings 94 and 95 which functions as bearings for sliding movement in the bore 84 of sleeve 80. Sleeve 81 has a flange portion 96 which slides in the bore 85 of sleeve 80. Flange portion 96 has a peripheral recess 97 in which there is positioned an elastomeric sealing member 98 located between hard plastic (polyethylene) backup rings or bearings 99 and 100. End plate 87 has sliding movement on end portion 101 of sleeve 81. End plate 87 is provided with a recess 102 in which there is positioned elastomeric seal 103 and backup rings 104 and 104 of a hard plastic (polyethylene) which function as bearings. Sleeve 81 is provided with an aperture or port 106 which opens from the interior of the slip joint into the space between flange 96 and end plate 87. Outer sleeve 80 has a port 108 which opens outward from chamber 90. The end of sleeve 89 is connected to a flexible bellows 109. A flexible bag 110 is positioned around the outside of the sleeve 80 and inflatable to provide a pressure seal enclosing port 108. A flexible diaphragm 111 is secured on the outside of sleeve portion 101 and secures a supply of clean oil therein to lubricate the sliding motion along the exterior of that sleeve portion. In operation, sleeves 80 and 81 are movable longitudinally with respect to each other. For very small degrees of movement the initial movement is accommodated or absorbed by deflection of the elastomeric seal members. Beyond a very small movement, the sleeve members 80 and 81 move in a telescopic manner and the arrangement of chambers containing oil functions to maintain a pressure balanced condition in the slip joint so that it does not tend to collapse under the pressure of exterior fluid to which it is subjected in operation. Ends 82 and 83 of sleeve members 80 and 81 respectively are attachable to conduit 34 by welding or other means. Slip joint 58 is preferably identical to slip joint 56.

The universal joint of this invention may be used in any multiline system requiring the universal flexing movement. This joint, however, is particularly designed for and advantageous in underwater riser systems for production of crude oil and gas as described above.

This multiline universal joint has substantial advantages over universal joints known in the prior art. One advantage is that this universal joint preferably utilizes the simplest of flexible components (fluid swivels and slip joints). The fluid swivels can be readily replaced without having to remove them sequentially or in a specific order. Therefore, it is not necessary to remove a stack or series of swivels to replace one defective swivel. The practical limit for the number of flow lines that can be accommodated depends upon the space in the hollow cross member. The overall arrangement substantially reduces weight and costs. The ability to individually replace one component eliminates the need for a complete shutdown of the equipment in the event of equipment failure.

The invention has been described fully and completely with respect to two embodiments thereof. It should be understood that equivalent components and equivalent modes of construction and assembly may be used without departing from the inventive concept. For example, The Engineers Illustrated Thesaurus, Herbert Herkimer, Chemical Publishing Company, Inc., 1952, P. 258-263, discloses a variety of articulated joints other than the yoke and cross type. The inventive concept of this invention as defined by the claims which follow can be applied in universal joints of a variety of types and also to other types of articulated joints. The invention, therefore, is not to be restricted except as is necessary by the prior art and by the lawful scope of the claims which follow.

What I claim is:

1. A universal joint comprising:
   a first longitudinally extending member;
   a second longitudinally extending member;
   means for connecting said first member to said second member to permit said first member to pivot about an axis normal to the longitudinal axis of the said first member and to permit said second member to pivot about an axis normal to the pivotal axis of said first member;
   at least one elbow conduit extending through said connecting means, said elbow conduit having at least one end portion being offset from and extending substantially parallel to one of said pivotal axis;
   a first conduit supported by said first member and connected to said offset end portion of said elbow conduit;
   a second conduit supported by said second member and connected to the other end of said elbow conduit;
   a pivot means disposed between said first conduit and said offset end portion of said elbow conduit for enabling pivotal movement between said elbow conduit and said first conduit; and
   a compensating means disposed in said first conduit permitting extensible movement of said first conduit to enable rotational movement of said pivot means around the pivot axis of said first longitudinally extending member.

2. The apparatus as defined in claim 1 wherein the pivot means comprises a swivel.

3. A universal joint as defined in claim 1 in which each of said members comprise a yoke having a longitudinally extending stem portion and bifurcated end, each of the arms of said bifurcated ends having transverse bores.

4. A universal joint as defined in claim 3 wherein said means for connecting said first member and said second member comprises a cross-shaped member having the oppositely extending arms thereof pivotally supported in the bores in the arms of said yokes.

5. The universal joint as defined in claim 4 in which said stem portion of each yoke is a hollow tubular housing supporting said plurality of conduits.

6. A universal joint as defined in claim 4 in which said cross-shaped member is hollow with passages extending from end to end of each of the arms thereof.

7. A universal joint comprising:
a first longitudinally extending member;
a second longitudinally extending member;
means for connecting said first member to said second member to permit said first member to pivot about an axis normal to the longitudinal axis of the said first member and to permit said second member to pivot about an axis normal to the pivot axis of said first member;
an elbow conduit extending through said connecting means;
a first conduit supported by said first member and connected to one end of said elbow conduit;
a second conduit supported by said second member and connected to the other end of said elbow conduit;
a pivot means disposed between said first conduit and said elbow conduit for enabling pivotal movement between said elbow conduit and said first conduit, said pivot means being offset from the pivot axis of said first member; and
a compensating means disposed in said first conduit permitting extensible movement of said first conduit to enable rotational movement of said pivot means around the pivot axis of said first longitudinally extending member.

8. The apparatus as defined in claim 7 wherein the pivot means comprise a swivel.

9. A universal joint as defined in claim 7 in which each of said members comprise a yoke having a longitudinally extending stem portion and bifurcated end, each of the arms of said bifurcated ends having transverse bores.

10. A universal joint as defined in claim 9 wherein said means for connecting said first member and said second member comprises a cross-shaped member having the oppositely extending arms thereof pivotally supported in the bores in the arms of said yokes.

11. The universal joint as defined in claim 10 in which said stem portion of each yoke is a hollow tubular housing supporting said first and second conduits.

12. A universal joint as defined in claim 11 in which said cross-shaped member is hollow with passages extending from end to end of each of the arms thereof.

* * * * *